Dec. 5, 1939.          H. RODERICK          2,182,096
COATING PIGMENT AND METHOD OF MAKING SAME
Filed June 15, 1937

INVENTOR.
Howard Roderick
BY Fay, Oberlin & Fay
ATTORNEYS

Patented Dec. 5, 1939

2,182,096

UNITED STATES PATENT OFFICE 2,182,096

COATING PIGMENT AND METHOD OF MAKING SAME

Howard Roderick, Grosse Isle, Mich., assignor to The Michigan Alkali Company, Wyandotte, Mich., a corporation of Michigan Application June 15, 1937, Serial No. 148,347

4 Claims. (Cl. 134—58)

The present invention relates to the manufacture of a calcium carbonate coating pigment particularly adapted for use as a paper coating material. The invention includes such a coating pigment as a new article of manufacture, as well as the method of making it.

A coating pigment for use in the paper making art must possess a combination of the following properties and qualities: good ink receptivity, covering power, brightness, smoothness, and a relatively low glue or adhesive requirement. Heretofore, it has been found possible to make a calcium carbonate coating pigment in which all of the properties except the glue requirement have been satisfactory. However, in such prior art calcium carbonate coating pigments, the glue or adhesive such as casein or other type of glue material, required to properly adhere and affix the pigment to the paper has been so great as to render such pigments economically prohibitive in the paper making industry. Heretofore, the glue requirement of calcium carbonate coating pigments has been in excess of 25%, an amount sufficient practically to prevent the commercial use of calcium carbonate paper coating pigments previously known.

It is the general object and nature of my present invention to provide a calcium carbonate coating pigment having the property of a relatively low glue requirement, in combination with the other properties and qualities of good ink receptivity, covering power, brightness, and smoothness, so that the resultant product will be commercially and economically acceptable to the paper making industry. I have discovered that a calcium carbonate coating pigment in which the particle size is graduated in a range varying from relatively coarse to relatively fine particle sizes possesses the combination of desired properties, and wherein the glue requirement is as low as 7%.

To the accomplishment of the foregoing and related ends, said invention, then, consists of the means hereinafter fully described and particularly pointed out in the claims.

The annexed drawing and the following description set forth in detail one method and one product exemplifying my invention, such disclosed procedure and product constituting, however, but one of various applications of the principles of my invention.

Figure 1:
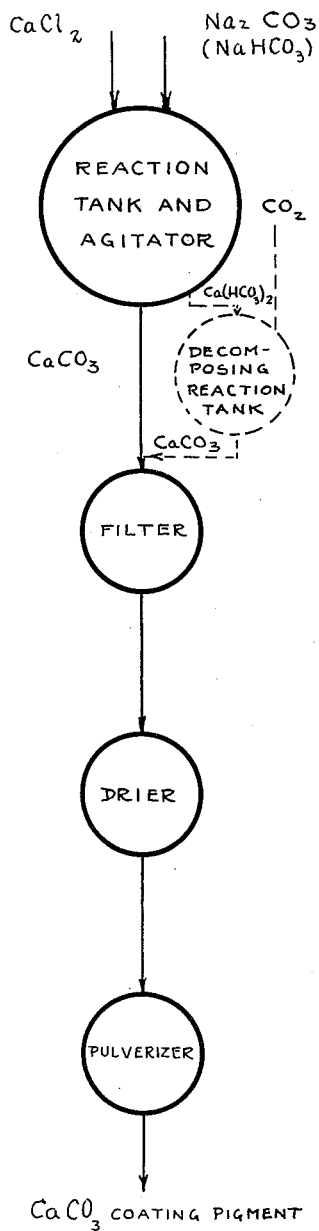
Figure 2:
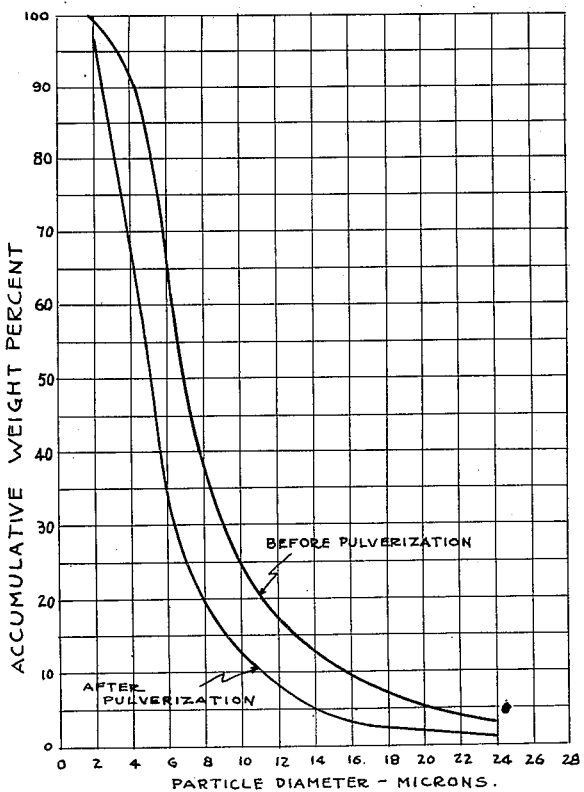

In said annexed drawing:

Fig. 1 is a flow sheet illustrating one method of making my new coating pigment; Fig. 2 is a diagram illustrative of the desired range of particle sizes of the calcium carbonate coating pigment embodying the principle of my invention.

The method of making my new calcium carbonate coating pigment involves the principal step of providing calcium carbonate by precipitation from solution under certain prescribed conditions. The method described in my copending application Serial No. 98,202, filed Aug. 27, 1936, serves as a basis for the practice of the present process. This method involves the precipitation of calcium carbonate from the reaction between calcium chloride liquor and decomposer liquor obtained from the ammonia soda process. Such calcium chloride liquor contains approximately 100 to 130 grams calcium chloride per liter and 60 to 80 grams sodium chloride per liter. The decomposer liquor obtained by the steam decomposition of a suspension of sodium bicarbonate in water contains from 230 to 250 grams of sodium carbonate per liter, and 60 to 100 grams undecomposed sodium bicarbonate per liter. The calcium chloride liquor and the decomposer liquor are introduced to a reaction tank and their temperature is maintained in the range of 150 to 220° F. Such a reaction tank is provided with a rapid agitator, and during such reaction and agitation, calcium carbonate is precipitated from the mixed solutions.

The relative concentration of sodium carbonate and sodium bicarbonate in the decomposer liquor is a very important factor in determining the nature of the resultant, precipitated calcium carbonate product. It has been found that the best results are obtained when the ratio of sodium carbonate to sodium bicarbonate in the decomposer liquor is in the range of from 2½ to 3½ to 1.

Another factor which has an important bearing upon the production of the desired product is the presence of an excess of calcium chloride in the reaction mixture at all times during the mixing process. Such excess of calcium chloride can be maintained in the reacting solution by pumping the calcium chloride solution into the reaction tank at a much more rapid rate than the decomposer liquor; or alternatively, the calcium chloride liquor can be added to the reaction tank before the introduction of the decomposer liquor, and the process operated as a "batch system."

The above factors of relative concentration of sodium carbonate and sodium bicarbonate, and the presence of an excess of calcium chloride contribute to the process the ability to produce a fine particle size of precipitated calcium carbonate. Conditions of temperature and rates of agitation also have a bearing upon the resultant range of particle size of the precipitated calcium carbonate.

Thus, for example, the greater the rate of agitation, the finer the particle size; and the higher the temperature, the larger the particle size. Therefore it can be said that the particle size of the precipitated calcium carbonate from the reacting solutions varies in inverse proportion to the rate of agitation and in direct proportion to the temperature, relative concentration of sodium carbonate to sodium bicarbonate, and excess of calcium chloride. It has been found that a temperature of 150° F. with a relatively rapid rate of agitation is quite satisfactory.

Dependent upon the time in which the reacting solutions are in contact and present in the reaction and agitating tank, the subsequent decomposition of calcium bicarbonate to calcium carbonate in a second reaction or decomposing tank may be required. In this subsequent decomposition, calcium bicarbonate is decomposed to calcium carbonate with the evolution of carbon dioxide according to the following equation:

$$Ca(HCO_3)_2 \rightarrow CaCO_3 + H_2O + CO_2$$

As indicated in the flow sheet in Fig. 1 of the drawing, the resultant calcium carbonate is then filtered, washed reasonably free of chlorides and foreign matter, and dried. The calcium carbonate at this stage of the process will be found to have varying particle sizes from relatively coarse to relatively fine, substantially as indicated in the following table:—

*Before pulverization*

| Diameter in microns | Accumulative percentage |
| --- | --- |
| 3 | 96.5 |
| 4 | 91.5 |
| 6 | 66.0 |
| 8 | 37.5 |
| 10 | 25.0 |
| 12 | 17.5 |
| 14 | 12.0 |
| 16 | 9.0 |
| 18 | 7.0 |
| 20 | 5.5 |
| 24 | 3.5 |

The above calcium carbonate is then subjected to a pulverizing operation in a suitable manner, such as in either a pebble mill or a roll type mill, to a point where the particle sizes are distributed over a range such as is represented in the following table:

*After pulverization*

| Diameter in microns | Accumulative percentage |
| --- | --- |
| 3 | 82.5 |
| 4 | 66.5 |
| 6 | 35.0 |
| 8 | .19.0 |
| 10 | 12.5 |
| 12 | 8.0 |
| 14 | 5.5 |
| 16 | 3.5 |
| 18 | 2.5 |
| 20 | 2.0 |
| 24 | 1.25 |

The glue requirement of the resultant product in which the particle sizes vary over a range from relatively coarse to relatively fine sizes is as low as 7%.

Fig. 2 represents the data of Tables 1 and 2 in the form of plotted curves, further illustrating the range of particle sizes and the percentages thereof in the final product. In Fig. 2, it will be seen that the particle diameter is plotted against the accumulative weight, and that the different particle sizes after pulverization are relatively finer than before pulverization. These two curves as shown in Fig. 2 substantially define the range of particle size distribution and limits prescribed for my new calcium carbonate coating pigment.

It will thus be seen that my invention provides calcium carbonate coating pigment in which the particle sizes are varied or distributed over a range from relatively coarse to relatively fine, and that such a pigment possesses the combination of properties and qualities of good ink receptivity, covering power, brightness, good finish or smoothness, and relatively low glue requirement, so that it is commercially and economically feasible for use in the paper making art.

The values in Tables 1 and 2 above were obtained by the settling method, being calculated by the use of Stoke's law. This procedure, known in laboratory parlance as the direct weight method, is herewith explained in detail in order to enable those skilled in the art to comprehend fully the nature of the invention.

DIRECTIONS FOR OBTAINING PARTICLE SIZE BY SETTLING METHOD

*Materials*

100 grams carbonate sample.
5 g. casein.
5% NaOH soln.
12 10-in. test tubes.
12 5-in. test tubes.
1 2-liter beaker.
14 100-cc. beakers.

*Procedure*

Soak carbonate in 1800 cc. distilled water for at least one hour, stirring occasionally. Meanwhile prepare the following solution. Soak five grams of casein in 100 cc. water for one-half hour. Then add sufficient alkali to dissolve casein (about 1.6 cc. of 5% NaOH) and allow to soak for one-half hour. Finally, heat 15 minutes at 130°–140° F. and cool.

After carbonate has soaked for one hour, siphon 30 cc. into each of several small test-tubes (agitation can be obtained by use of air jet). To each of these filled tubes add 0, 4, 8, 12, etc., drops, respectively, of casein solution. This is done to determine amount of casein needed to deflocculate carbonate. Shake tubes and allow to stand one-half hour. The correct amount of casein solution to add is indicated by the formation of a precipitate that adheres to the bottom of the tube when the tube is gently tipped upside-down. (Sometimes a bubble-like mass is noted, but this is not the true indication.)

Add casein solution to the main body of carbonate solution in the proportion found to give deflocculation and agitate solution for one hour.

Graduate large test-tubes in following manner: put mark near bottom of tube at a definite volume (20 cc.) and another near top at a definite height (19 cm.) from lower mark.

Siphon deflocculated solution into large, graduated tubes, filling to the upper mark and noting time of filling. Draw off solution from tube No. 1 down to lower mark five minutes after filling. Do same with No. 2 at ten minutes and so on with the entire twelve tubes. Suggested time intervals are 5, 10, 15, 25, 40, 60, 100, 150, 240, 480, 720, 1080 min.

In addition, draw off a 50 cc. sample at the beginning and another at the end of the tube filling operation. These are used to check the concentration of the solution.

Transfer precipitate and solution remaining in tubes to 100 cc. beakers. Do same with 50 cc. samples. Dry at 100° C. to constant weight and weigh precipitates.

The plot of particle size versus accumulative weight may be obtained from the following relationship (Stoke's law):

$$r^2 = \frac{9}{2} \frac{nh}{(\Delta - d)gt}$$

$r$ = particle rad. (cm.).
$n$ = viscosity of soln. (poises).
$h$ = height between marks (19 cm. in this case).
$\Delta$ = sp. gr. of solid.
$d$ = sp. gr. of water (solvent).
$g$ = 980 cm. per sec.
$t$ = seconds elapsed.

Substituting the values of $g$ and $h$ in the above equation and changing $r$ to the diameter D, the following equation is obtained:

$$D^2 = .3490 \frac{n}{(\Delta - d)t}$$

Upon changing D to microns, $t$ to minutes, and $n$ to centipoises, this equation of Stoke's law reduces to the following form for use in this method, viz.:

$$D^2 = \frac{5817n}{(\Delta - d)t}$$

Other modes of applying the principle of my invention may be employed instead of the one explained, change being made as regards the product and method herein disclosed, provided the step or steps stated by any of the following claims or the equivalent of such stated step or steps be employed.

I therefore particularly point out and distinctly claim as my invention:

1. A coating pigment for paper and the like consisting of calcium carbonate of which 96½% has a particle size larger than 3 microns, of which 91½% has a particle size larger than 4 microns, of which 66% has a particle size larger than 6 microns, of which 37½% has a particle size larger than 8 microns, of which 25% has a particle size larger than 10 microns, of which 15½% has a particle size larger than 12 microns, of which 12% has a particle size larger than 14 microns, of which 9% has a particle size larger than 16 microns, of which 7% has a particle size larger than 18 microns, of which 5½% has a particle size larger than 20 microns, of which 3½% has a particle size larger than 24 microns.

2. A coating pigment for paper and the like consisting of calcium carbonate of which 82½% has a particle size larger than 3 microns, of which 66½% has a particle size larger than 4 microns, of which 35% has a particle size larger than 6 microns, of which 19% has a particle size larger than 8 microns, of which 12½% has a particle size larger than 10 microns, of which 8% has a particle size larger than 12 microns, of which 5½% has a particle size larger than 14 microns, of which 3½% has a particle size larger than 16 microns, of which 2½% has a particle size larger than 18 microns, of which 2% has a particle size larger than 20 microns, of which 1¼% has a particle size larger than 24 microns.

3. A method of making a calcium carbonate coating pigment for paper and the like consisting in the steps of precipitating calcium carbonate from reacting solutions of sodium carbonate, sodium bicarbonate, and calcium chloride, in which the relative concentration of sodium carbonate to sodium bicarbonate is in the range of 2½–3½ to 1, in the presence of an excess of calcium chloride, agitating and heating such reacting solutions during precipitation in a temperature range of 150 to 220° F., filtering, washing, drying the precipitated calcium carbonate, and then subjecting the latter to a pulverizing action.

4. A method of making a calcium carbonate coating pigment for paper and the like consisting in the steps of precipitating calcium carbonate from reacting solutions of sodium carbonate, sodium bicarbonate, and calcium chloride, in which the relative concentration of sodium carbonate to sodium bicarbonate is in the range of 2½–3½ to 1, in the presence of an excess of calcium chloride, and agitating and heating such reacting solutions during precipitation in a temperature range of 150 to 220° F.

HOWARD RODERICK.